United States Patent
Ungstrup et al.

(10) Patent No.: US 10,880,656 B2
(45) Date of Patent: Dec. 29, 2020

(54) COMMUNICATION CHANNELS BETWEEN A PERSONAL COMMUNICATION DEVICE AND AT LEAST ONE HEAD-WORN DEVICE

(71) Applicant: WIDEX A/S, Lynge (DK)

(72) Inventors: Michael Ungstrup, Allerod (DK); Michael Johannes Pihl, Copenhagen (DK); Jan Hesselballe, Soborg (DK); Mike Lind Rank, Farum (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 16/524,392

(22) Filed: Jul. 29, 2019

(65) Prior Publication Data
US 2019/0349691 A1 Nov. 14, 2019

Related U.S. Application Data

(63) Continuation of application No. PCT/EP2018/052390, filed on Jan. 31, 2018.
(Continued)

(51) Int. Cl.
*H04R 25/00* (2006.01)
*H04M 1/60* (2006.01)

(52) U.S. Cl.
CPC ........ *H04R 25/305* (2013.01); *H04M 1/6066* (2013.01); *H04R 25/554* (2013.01)

(58) Field of Classification Search
CPC .. H04R 25/305; H04R 25/554; H04M 1/6066
See application file for complete search history.

(56) References Cited

U.S. PATENT DOCUMENTS

| 4,918,736 A | 4/1990 | Bordewijk |
| 8,538,050 B2 | 9/2013 | Fink et al. |

(Continued)

FOREIGN PATENT DOCUMENTS

| EP | 2 378 794 A1 | 10/2011 |
| EP | 2 403 273 A1 | 1/2012 |

(Continued)

OTHER PUBLICATIONS

Written Opinion for PCT/EP2018/052390, dated Mar. 27, 2018.
International Search Report for PCT/EP2018/052390, dated Mar. 27, 2018.

*Primary Examiner* — Regina N Holder
(74) *Attorney, Agent, or Firm* — Sughrue Mion, PLLC

(57) ABSTRACT

A hearing assistive system includes a personal communication device and a head-worn device. The personal communication device has a user interface for user interaction, a processor controlling the user interface and for running an application program, and input and output transducers. The head-worn device has an input transducer adapted for converting sound into an electric signal applied to a processor outputting a modified audio signal via an output transducer. The application program generates a data packet modulated on an audio carrier for output via the output transducer, decodes a data packet modulated on an audio carrier and received via the input transducer. The head-worn device has an audio signaling block having a detector block and a response block. The detector block detects and decodes the data packet received by the input transducer. The response block generates a data packet modulated on an audio carrier for output via the output transducer.

18 Claims, 4 Drawing Sheets

Related U.S. Application Data

(60) Provisional application No. 62/454,310, filed on Feb. 3, 2017.

(56) References Cited

U.S. PATENT DOCUMENTS

| | | | |
|---|---|---|---|
| 8,711,656 | B1 | 4/2014 | Paulson |
| 9,161,138 | B2 | 10/2015 | Pedersen et al. |
| 2003/0007647 | A1 | 1/2003 | Nielsen et al. |
| 2009/0076825 | A1* | 3/2009 | Bradford .............. H04R 25/552 704/271 |
| 2010/0053169 | A1 | 3/2010 | Cook |
| 2010/0278345 | A1 | 11/2010 | Alsina et al. |
| 2013/0122810 | A1 | 5/2013 | Kaufman |
| 2013/0265144 | A1 | 10/2013 | Banna et al. |
| 2015/0023512 | A1* | 1/2015 | Shennib ................ H04R 25/70 381/60 |
| 2015/0358748 | A1 | 12/2015 | Pedersen |
| 2016/0249144 | A1 | 8/2016 | Reinlein |
| 2017/0013372 | A1 | 1/2017 | Goorevich et al. |
| 2017/0054763 | A1* | 2/2017 | Pedersen ............ H04L 65/1069 |

FOREIGN PATENT DOCUMENTS

| | | |
|---|---|---|
| EP | 2 439 960 A1 | 4/2012 |
| EP | 2 849 459 A1 | 3/2015 |
| EP | 2 871 857 A1 | 5/2015 |
| FR | 2 759 231 A1 | 8/1998 |

* cited by examiner

COMMUNICATION CHANNELS BETWEEN A PERSONAL COMMUNICATION DEVICE AND AT LEAST ONE HEAD-WORN DEVICE

RELATED APPLICATIONS

This application is a continuation of PCT/EP2018/052390, which claims priority from a provisional application No. 62/454,310, filed on Feb. 3, 2017, the disclosures of which are incorporated by reference in their entirety.

BACKGROUND OF THE INVENTION

1. Field of the Invention

The present invention relates to hearing assistive system, comprising a personal communication device and at least one head-worn device. The invention, more particularly, relates to a method for handling audio-based communication between the personal communication device and the at least one head-worn device, a method of controlling the head-worn device remotely from the personal communication device, a personal communication device and a computer-readable storage medium having computer-executable instructions for carrying out the invention.

SUMMARY OF THE INVENTION

The purpose of the invention is to provide a hearing assistive system with improved communication between a personal communication device and a head-worn device.

According to the invention, this purpose is achieved by a hearing assistive system, comprising a personal communication device and a head-worn device. The personal communication device has a user interface being adapted for user interaction, a processor controlling the user interface and being adapted to run an application program, an input transducer and an output transducer. The head-worn device has an input transducer adapted for converting sound into an electric signal applied to a processor outputting a modified audio signal via an output transducer. The application program is adapted to generate a data packet modulated on an audio carrier and output via the output transducer, and to decode a data packet modulated on an audio carrier and received via the output transducer. The head-worn device has an audio signaling block having a detector block and a response block. The detector block is adapted to detect and decode the data packet received by the input transducer. The response block is adapted to generate a data packet modulated on an audio carrier and output via the output transducer.

In one embodiment, the head-worn device is a hearing assistive device, and the processor is configured to compensate a hearing loss of the hearing assistive device user.

According one embodiment of the invention, the hearing assistive system is used for updating fitting data by writing fitting data to a non-volatile memory of the head-worn device by means of the personal communication device.

According one embodiment of the invention, the hearing assistive system is used for performing a self-test of the head-worn device by means of the personal communication device, wherein the personal communication device requests one or more self-test results and wherein the one or more self-test results are selected from self-tests ensuring that a specific part of the electronics operates as desired; or self-tests ensuring the integrity of the non-volatile memory 7 by checking e.g. a hash value.

According to a second aspect of the invention there is provided a method of providing two-way communication between a head-worn device and a personal communication device. The personal communication device has a user interface being adapted for user interaction, a processor controlling the user interface and being adapted to run an application program, an input transducer, and an output transducer. The head-worn device has an input transducer adapted for converting sound into an electric signal applied to a processor outputting a modified audio signal via an output transducer. The method comprises steps of generating, in the personal communication device, a data packet by means of the application program running on the processor, and outputting the data packet on an audio carrier via the output transducer; receiving, in the head-worn device, the data packet via the input transducer, and decoding the data packet in an audio signaling block; providing, in the head-worn device, a responding data packet in the audio signaling block, and outputting the data packet on an audio carrier via the output transducer; and receiving in the personal communication device, the data packet via the input transducer and decoding the data packet data packet in the application program running on the processor.

According to a third aspect of the invention there is provided a personal communication device having a user interface being adapted for user interaction, a processor controlling the user interface and being adapted to run an application program, an input transducer and an output transducer. The application program is adapted to generate a data packet modulated on an audio carrier and output via the output transducer, and to decode a data packet modulated on an audio carrier and received via the output transducer.

According to a fourth aspect of the invention there is provided a computer-readable storage medium having computer-executable instructions, which, when executed by a processor of a personal communication device, provides an application program having a user interface being adapted for user interaction. The application program is adapted to generate a data packet modulated on an audio carrier and output via the output transducer; and to decode a data packet modulated on an audio carrier and received via the output transducer.

According to a fifth aspect of the invention there is provided a head-worn device having an input transducer adapted for converting sound into an electric signal applied to a processor outputting a modified audio signal via an output transducer. The head-worn device comprises an audio signaling block having a detector block and a response block. The detector block is adapted to detect and decode the data packet received by the input transducer. The response block is adapted to generate a data packet modulated on an audio carrier and output via the output transducer.

BRIEF DESCRIPTION OF THE DRAWINGS

The invention will be described in further detail with reference to preferred aspects and the accompanying drawing, in which.

DETAILED DESCRIPTION OF THE INVENTION

The current invention relates to a head-worn device 20, preferably embodied as a hearing assistive device being adapted to at least partly fit into the ear of the wearer and amplify sound. Hearing assistive devices include Personal Sound Amplification Products and hearing aids. Both Personal Sound Amplification Products (PSAP) and hearing aids are small electroacoustic devices which are designed to process, amplify or limit sound for the wearer. Personal Sound Amplification Products are mostly off-the-shelf amplifiers for people with normal hearing who need a little adjustment in volume (such as during hunting, concerts or bird watching).

Figure 1:
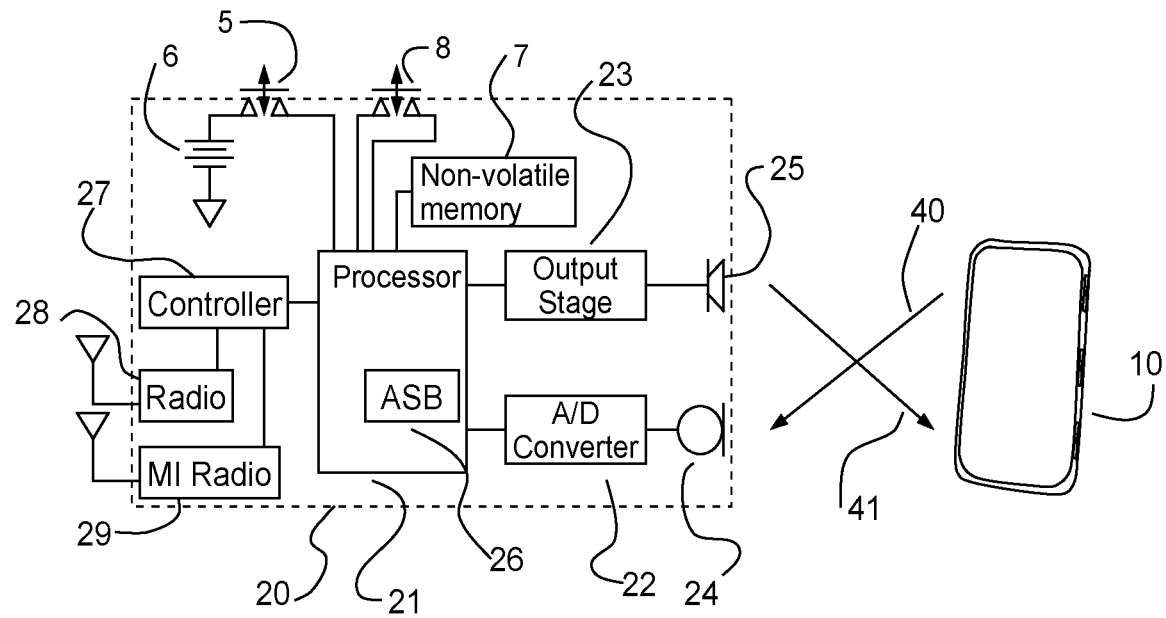
FIG. 1 illustrates schematically a first embodiment of a hearing assistive system, comprising a personal communication device and a head-worn device, according to the invention.

Reference is made to FIG. 1, which schematically illustrates a first embodiment of a hearing assistive system, comprising a personal communication device 10 and a head-worn device 20 according to the invention. The head-worn device 20 according to the embodiment shown in FIG. 1 is a hearing aid or a hearing assistive device. The personal communication device 10 may e.g. be a smartphone with an advanced mobile operating system that combines features of a personal computer operating system with features useful for mobile or handheld use.

The head-worn device 20 or the hearing assistive device has at least one input transducer or microphone 24 picking up an audio signal and transforming it into an analog signal. An analog-to-digital converter 22 (e.g. a delta sigma converter) receives the analog signal and provides a digital signal for a digital signal processor 21. The digital signal processor 21 is preferably a specialized microprocessor with its architecture optimized for the operational needs of digital signal processing, and in the illustrated embodiment the processor 21 is adapted for amplifying and conditioning of the audio signal intended to become presented for the hearing aid user. The amplification and conditioning is carried out according to a predetermined setting stored in a non-volatile memory 7 (e.g. an EEPROM) in order to alleviate a hearing loss by amplifying sound at frequencies in those parts of the audible frequency range where the user suffers a hearing deficit.

According to the illustrated embodiment of the invention the processor 21 outputs a digital signal fed to a digital output stage 23 and an output transducer or a speaker 25. The speaker 25 may be driven as a class D amplifier by the one-bit digital data stream received.

The hearing assistive device includes a controller 27 which according to the illustrated embodiment is controlling the operation of a short-range radio 28 and a magnetic induction radio 29. The short-range radio 28 is preferably operating according to the Bluetooth™ protocol. Bluetooth™ is a wireless technology standard for exchanging data over short distances using the ISM band from 2.4 to 2.485 GHz. Bluetooth™ is widely used for short-range communication, for building personal area networks (PAN), and is employed in most mobile phones. Bluetooth™ Low Energy (BLE) has a fixed packet structure with two types of packets; Advertising and Data. The data packets may contain payload as audio for audio streaming or instructions for programming the hearing assistive device. Programming includes two different aspects—acoustic programming refers to setting parameters (e.g. gain and frequency response) affecting the sound output to the user, which carries risk of potentially damaging the residual hearing by making wrong settings; and operational programming refers to settings which do not affect the sound significantly, such as volume control and selection of environmental programs.

The hearing aids 20 according to the illustrated embodiment are provided to a hearing-impaired user as a set of binaural hearing aids. The magnetic induction radio 29 provides a low power communication channel for an inter-ear communication between the two hearing aids 20. The magnetic induction radio 29 may operate as a Near-Field Magnetic Induction (NFMI) communication system as known for WBAN systems and may apply FSK modulation, which is a frequency modulation scheme in which digital information is transmitted through discrete frequency changes of a carrier signal. The operational range for magnetic induction radios 29 is relatively short; less that 1-2 meters, and with low power as used in hearing assistive devices, the range may preferably be in the range of 20-30 cm. The standard modulation schemes used in typical RF communications (amplitude modulation, phase modulation, and frequency modulation) can be used in near-field magnetic induction system. As an alternative to FSK modulation, PSK modulation or m-ary FSK modulation may be applied. FSK modulation will be robust even in the absence of line of sight between the transmitter and the receiver, while PSK modulation will have a better modulation form for specific use cases. The magnetic induction radio 29 may be used for exchanging audio between the binaural hearing aids 20, for exchanging control parameters between the binaural hearing aids 20, or for synchronizing the binaural hearing aids 20.

Furthermore, the processor 21 incorporates according to one embodiment of the invention an audio signaling block (ABS) 26 for detecting and decoding one or more data packets received by the input transducer 24. In another embodiment, the audio signaling block 26 is adapted for modulating and coding one or more data packets originated from the processor 21 and to be output from the head-worn device 20 via the digital output stage 23 and the output transducer or speaker 25.

The head-worn device 20 includes a replaceable battery 6 for powering the electronic components. A push button 5 is illustrated for switching the power on and off. In practice the powering on and off is controlled by opening and closing a battery door present in the housing of the head-worn device 20. The head-worn device 20 furthermore includes a push button switch 8 providing the user interface for controlling the operation of the head-worn device 20. The function of the push button switch 8 is dependent on the current mode of head-worn device 20.

The personal communication device 10 may as mentioned earlier be able to communicate with the head-worn device 20 via respective radios supporting e.g. Bluetooth communication, and in addition to this, the personal communication device 10 is according to one embodiment of the invention able to transmit a signal 40 based upon an acoustic coding scheme to the head-worn device 20. In one embodiment, the head-worn device 20 may provide a response signal 41 to the personal communication device 10 based upon a similar acoustic coding scheme as indicated with the arrows 40 and 41 in FIG. 1.

Figure 2:
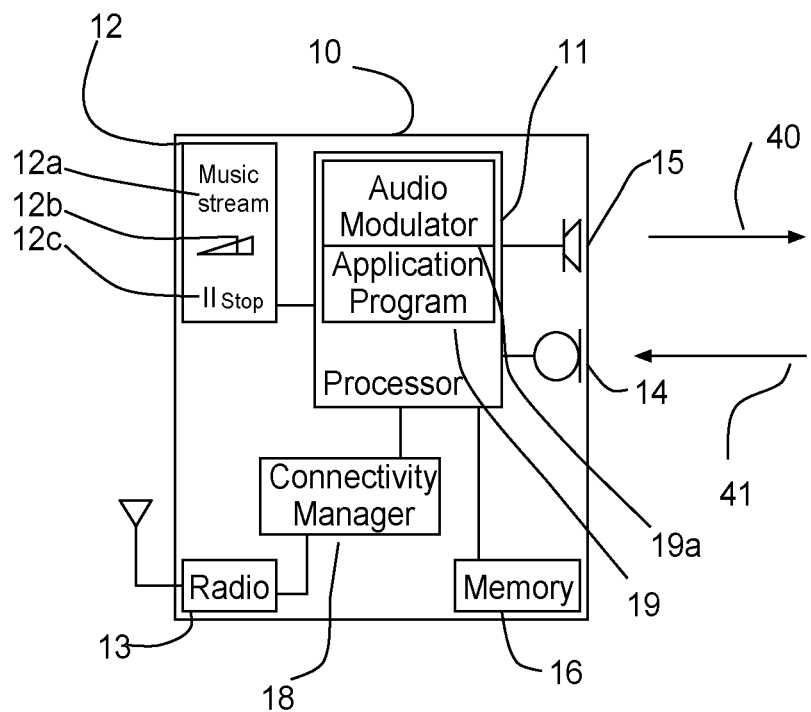
FIG. 2 illustrates an embodiment of a personal communication device having a processor for running an application program according to the invention.

FIG. 2 illustrates the basic elements of a personal communication device 10. The personal communication device 10 includes a general-purpose processor 11, which is a central processing unit (CPU) that carries out the instructions of a computer program by performing the basic arithmetic, logical, control and input/output (I/O) operations specified by the instructions. The general-purpose processor 11 is associated with memory 16 forming a computer-readable storage medium having computer-executable instructions.

The personal communication device 10 includes a microphone 14 for picking up audio, primarily speech, and generating an electronic representation for the audio signal to be fed to the general-purpose processor 11. As modern smartphones are multi-radio devices having radio interfaces towards cellular networks as GSM, WCDMA and LTE, short-range networks as WLAN and Bluetooth™, and for positioning as GPS, the personal communication device 10 includes a connectivity manager 18 managing telephone calls, data transmission and data receiving via a multi-mode radio including a short-range radio 13. The personal communication device 10 includes a user interface 12, such a touchscreen, enabling the user to interact directly with what is displayed.

FIG. 2 illustrates that user interface 12 displays a screen shot for a hearing aid control app 19*a* including the audio modulator according to the invention. The screen shot for the hearing aid control app 19*a* includes a header 12*a* informing the user about the hearing aid program currently selected, here "Music stream". The user may select the appropriate program by swiping and tapping the control area comprising the header 12*a*. The list of available hearing aid programs includes traditional hearing aid programs optimized for specific listening situations, streaming programs for streaming audio, telephone conversation or music from the personal communication device 10 to the head-worn device 20, and a specific flight mode program where the short-range radio link between the personal communication device 10 and the head-worn device 20 is shut down. The screen shot for the hearing aid control app 19*a* includes further controls, often hearing aid program dependent. A volume control area 12*b* indicates the current volume by means of a movable bar informing the user about the current volume level relative to the volume range permitted for user adjustment and marked by a triangle permitting the user to slide the movable bar between min and max of the permitted volume range. A hearing aid program control area 12*c* permits the user to stop the music stream. The user may select the appropriate program by swiping and tapping the hearing aid program control area 12*c*.

The personal communication device 10 includes a speaker 15 for output delivered from the general-purpose processor 11.

The memory 16 is illustrated as one unit, but a man skilled in the art is aware that a computer memory comprises a volatile memory part acting as working memory (Random-Access Memory) and requiring power to maintain the stored information, and a non-volatile memory part (e. g. Read-Only Memory, flash memory) in which stored information is persistent after the personal communication device 10 has been powered off.

The memory 16 may contain computer-executable instructions for a plurality of application programs 19 (apps) including an audio modulation app 19*a*. The application programs 19 may be downloaded from an app store on a remote server or pre-stored in the personal communication device 10 from factory. The general-purpose processor 11 runs the computer-executable instructions for the audio modulation app 19*a* and provides an application program having a user interface 12 being adapted for user interaction. The audio modulation app 19*a* includes computer-executable instructions for generating a command, often in response to a user interaction, embedding the command in data for at least one data packet 70, modulating the data according to a predetermined acoustic coding scheme, and outputting the data packet 70 on an audio carrier via the output transducer 15 intended for the head-worn device 20. The command contained in the data packet 70 controls the mode of the head-worn device 20. According to the invention, the command contained in the data packet 70 controls the mode of a radio of the head-worn device 20.

Figure 6:
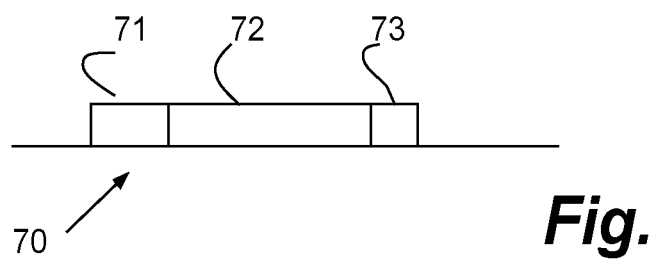
FIG. 6 illustrates the structure of a data packet on an audio carrier used for communication, according to one embodiment of the invention.

One embodiment for a data packet 70 according to the invention is illustrated with reference to FIG. 6. The data packet 70 comprises control information and user data, which is also known as the payload. The control information may preferably be a header 71, e.g. a sync word or a preamble used to synchronize a data transmission and being a known sequence of data used to identify the start of a frame. The payload 72 may contain predetermined commands instructing the head-worn device 20 to perform predetermined actions upon reception of the command. The payload 72 may also contain instructions to store transmitted data in specified memory locations of the head-worn device 20. Furthermore, the data packet 70 includes in the illustrated embodiment a cyclic redundancy check (CRC) segment 73 comprising an error-detecting code adapted for detecting accidental changes to raw data. The data packet 70 has a short check value attached, based on the remainder of a polynomial division of their contents. On retrieval, the calculation is repeated and, in the event the check values do not match, corrective action can be taken against data corruption.

Figure 3:
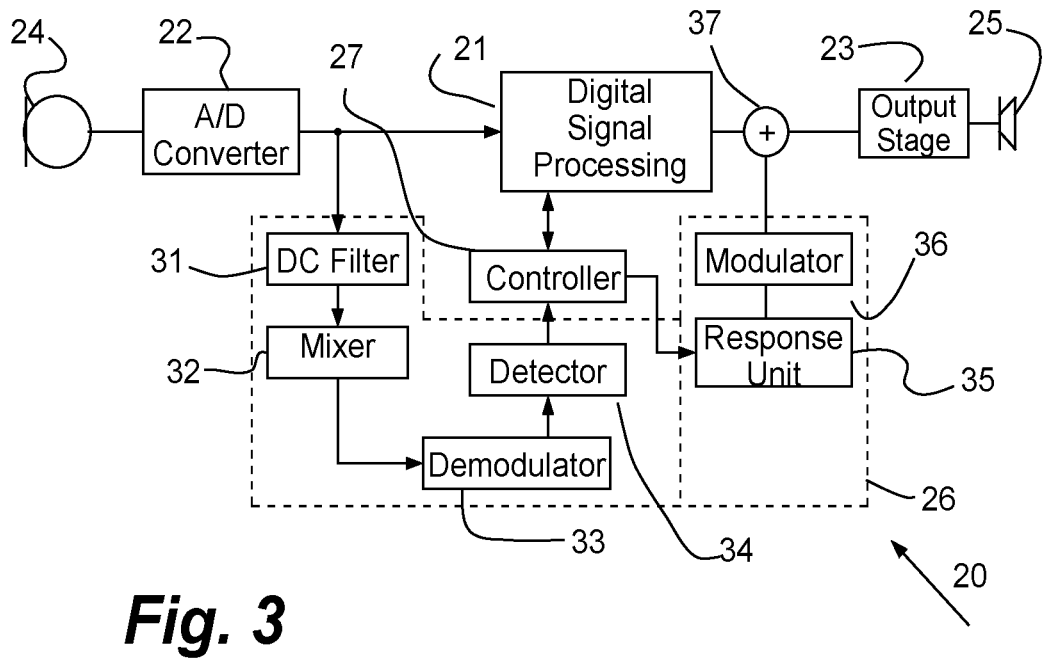
FIG. 3 illustrates an embodiment of a head-worn device according to the invention having an audio signaling block.

FIG. 3 illustrates an embodiment of a head-worn device 20 according to the invention comprising the audio signaling block 26. The audio signaling block 26 receives the signal picked up by the microphone 24 and converted into a digital representation by the analog-to-digital converter 22 from a branch from the signal path in the processor 21. In the illustrated embodiment, Frequency-Shift Keying (FSK) is applied as a modulation scheme in which digital information is transmitted through discrete frequency changes of a carrier signal.

At the input of the audio signaling block 26, a DC filter 31 removes DC offset present in the digital signal. A mixer 32 removes a carrier frequency by mixing down the received signal to base band. Preferably, the carrier frequency is predefined in the range of 8-18 kHz ensuring that the data packet 70 is present at a sufficiently high frequency in order not to disturb the environment by making an annoying sound and in order that the data packet 70 is present at a sufficiently low frequency so a hearing aid microphone 24 and smartphone speaker 15 and/or microphone 14 can pick up or, respectively, output the sound. Preferably, the mixer 32 creates an in-phase (I) component as well as a quadrature (Q) component being shifted 90° in phase relatively to the in-phase (I) component.

An FSK demodulator 33 receives the in-phase (I) component and the quadrature (Q) component and uses a conventional matched filter approach in FSK to detect which frequency the incoming signal has. Preferably, the received signal is mixed with the possible signal frequencies, and the resulting signal with the highest level corresponds to the transmitted frequency. The highest magnitude for the various frequencies is selected and the corresponding symbol is assigned.

An FSK detector 34 is adapted to detect the start of the data packet 70 based on the data contained in the header 71, to validate an error free reception based upon the error-detecting code contained in the cyclic redundancy check (CRC) segment 73, and to take corrective action against data corruption if possible. When the data packet 70 has been successfully detected, the FSK detector 34 extracts the payload 72 and supplies data to a controller 27. The controller 27 translates the data received from the FSK detector 34 into commands to perform predetermined actions or into instructions to store transmitted data in specified memory locations of the head-worn device 20.

According to the invention, the audio modulation app 19a of the personal communication device 10 has a modulator for modulating audio data signals targeted for the head-worn device 20. The audio signaling block 26 of the head-worn device 20 demodulates the audio data signal and extracts the content. In some embodiments the audio signaling block 26 of the head-worn device 20 has a modulator for modulating audio data signals targeted for the personal communication device 10. For this purpose, the audio modulation app 19a of the personal communication device 10 has demodulation facilities for demodulating the audio data signal and extracting the content. Hereby a return way for remote control commands is established, and the head-worn device 20 may acknowledge that a command has been received successfully and that the instructions have been carried out. The personal communication device 10 may retransmit a command if the head-worn device 20 has not acknowledged the reception of an original command within a predetermined period of time.

The invention is also applicable in a fitting situation as the personal communication device 10 transmits data packets to the head-worn device 20. The data packets 70 contain instructions to store transmitted data in specified memory locations of the head-worn device 20. The transmitted data comprise settings by which the processor 21 is adapted to alleviate a hearing loss by amplifying sound at frequencies in those parts of the audible frequency range where the user suffers a hearing deficit. The personal communication device 10 successively transmits programming data packets 70, for each packet awaiting a responding data package from the head-worn device 20 verifying that the previous programming data packet 70 has been successfully received and handled.

When the controller 27 identifies a need for sending a message to the personal communication device 10, a response unit 35 is instructed to prepare an appropriate command for a data packet 70. The data packet 70 is then transferred to a modulator 36 providing the audio FSK modulation. The audio FSK modulated data packet 70 is added to the output from the DSP processor 21 in a summation point 37, and thereafter converted to sound by means of the output stage 23 and the speaker 25.

The audio signaling block 26 includes a detector block (the DC filter 31, the mixer 32, the FSK demodulator 33, and the FSK detector 34) adapted to detect and decode the data packet (70) received by the input transducer (24); and a response block (response unit 35 and the modulator 36) adapted to generate a data packet (70) modulated on an audio carrier and output via the output transducer (25).

Figure 4:
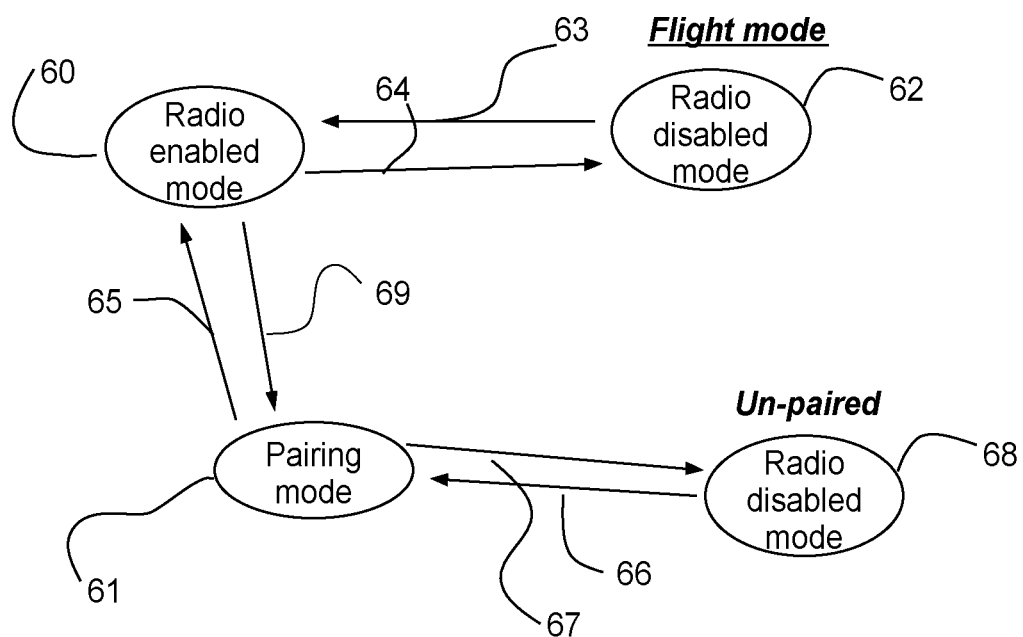
FIG. 4 illustrates that an embodiment of the hearing device may assume several modes.

The commands from the personal communication device 10 may include a radio control command, such as a "radio disable command" or a "radio enable command". These commands control the radios of the head-worn device 20. In one embodiment, the short-range radio 28 is a Bluetooth radio with a 10-meter range, and thereby compelled by the guidelines from Federal Aviation Administration to be suspended in certain situations (The U.S. Department of Transportation's Federal Aviation Administration (FAA) announced in 2013 that it has been determined that airlines can safely expand passenger use of Portable Electronic Devices (PEDs) during all phases of flight). The magnetic induction radio 29 has a significantly shorter range and the inter-ear communication between two head-worn devices 20 will therefore not have to be suspended according to the guidelines from Federal Aviation Administration. When the head-worn devices 20 in a radio enabled mode 60 (e.g. normal hearing aid mode), as illustrated with reference to FIG. 4, receive a "radio disable command", the controller 27 suspends or disables the short-range radio 28 and enters a radio disabled mode 62 (e.g. the flight mode) as indicated by the arrow 64. The head-worn device 20 stays in this mode until the controller 27 receives a "radio enable command" from the audio signaling block 26. Then the controller 27 enables the short-range radio 28 and enters the radio enabled mode 60 as indicated by the arrow 63.

According to one embodiment, the audio modulation app 19a is controlled by the connectivity manager of the personal communication device 10. When the user turns the personal communication device 10 into flight mode as prescribed by guidelines from Federal Aviation Administration, the audio modulation app 19a interprets the mode change of the personal communication device 10 as a trigger for automatically instructing the head-worn device 20 to follow the mode change by automatically sending a "radio disable command". Hereby the head-worn device 20 follows the mode of the personal communication device 10 and enters and leaves automatically the radio disabled mode 62 without any head-worn device 20 dedicated user interaction.

When a user receives a new head-worn device 20 and he intends to pair a personal communication device 10 to the head-worn device 20, according to one embodiment of the invention, the user downloads an app having an audio signaling block 26 according to the invention and the user initiates the transmission of a "radio pair command". The head-worn device 20 will while un-paired be in the radio disabled mode 68.

When the audio signaling block 26 detects a "radio pair command" included in the data packet 70, the controller 27 initiates a pairing mode 61 for the short-range radio link between the personal communication device 10 and the head-worn device 20. The entering of paring mode is indicated with an arrow 66 and is normally initiated from the radio disabled mode 68. Hereby it becomes easier to pair the two devices, as the head-worn device 20 no longer needs to be re-booted in order to initiate paring mode 61. The head-worn device 20 remains in pairing mode 61 for a predetermined period of time, e.g. 2 minutes, or until pairing has been completed. If pairing was successful, the head-worn device 20 enters the radio enabled mode 60 as indicated by an arrow 65. If no pairing has been achieved after the predetermined period of time, the head-worn device 20 resumes the radio disabled mode 68 as indicated by an arrow 67.

It is also possible for the head-worn device 20 to enter pairing mode 61 from the radio enabled mode 60 in case the user indicates via the app that he intends to pair the head-worn device 20 with an additional personal communication device 10. The "radio pair command" may in one embodiment include a user ID previously linked to and known by the personal communication device 10.

According to one embodiment of the invention, the reception of a radio control command will cause the processor 21, when the contained instruction has been executed, to retrieve a pre-recorded or pre-synthesized speech sequence from an associated memory 7 of the head-worn device 20 and play the speech sequence via the speaker 25 verifying for the user that the instruction has been executed. The "radio disable command" may have an associated speech sequence output saying: "flight mode has been entered".

Figure 5:
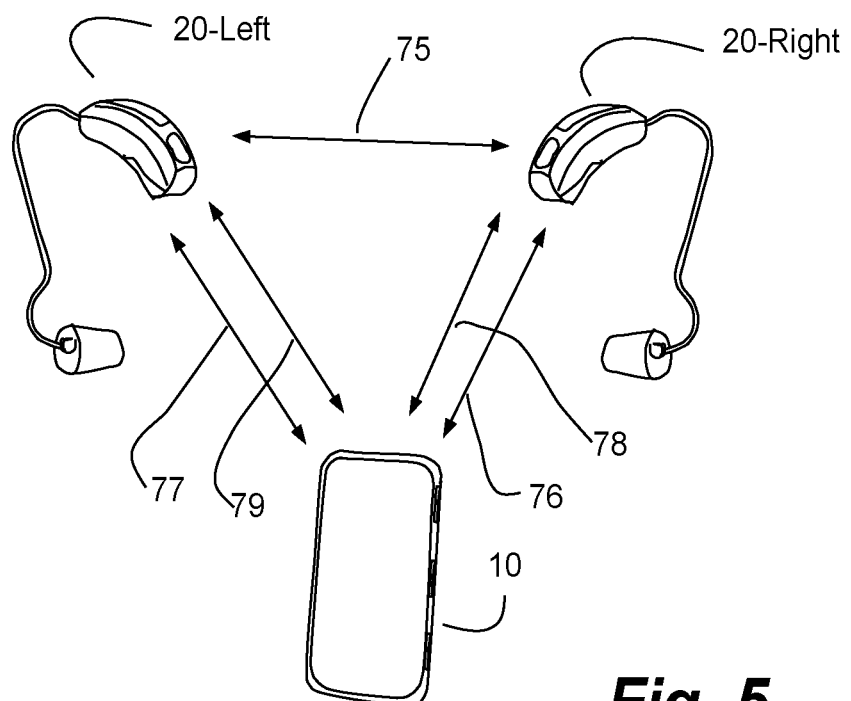
FIG. 5 illustrates the communication paths between a personal communication device and two head-worn devices according to the invention.

FIG. 5 illustrates the communication paths between the personal communication device 10 and the two head-worn devices 20-Left and 20-Right according to one embodiment of the invention. The two head-worn devices 20-Left and 20-Right each includes the magnetic induction radio 29 (FIG. 1) being responsible for the inter-ear communication 75 between two head-worn devices 20. The inter-ear communication 75 is not regulated by the flight mode guidelines from Federal Aviation Administration and may therefore be mode independent and enabled whenever the two head-worn devices 20-Left and 20-Right are in operation.

The short-range radio link 76 and 77 between the personal communication device 10 and the respective one of the two head-worn devices 20-Left and 20-Right is in one embodiment provided by respective Bluetooth radios, and thereby required by the guidelines from Federal Aviation Administration to be suspended. The short-range radio links 76 and 77 are mode dependent and will be enabled when the personal communication device 10 and the two head-worn devices 20-Left and 20-Right all are in radio enabled mode 60 or pairing mode 61.

The acoustic communication link 78 and 79 between the personal communication device 10 and the respective one of the two head-worn devices 20-Left and 20-Right is according to the invention provided by the audio modulator app 19a in the personal communication device 10 and the audio signaling block 26 of the respective one of the two head-worn devices 20-Left and 20-Right. The acoustic communication link 78 and 79 is not subject to the flight mode guidelines from Federal Aviation Administration and is enabled when the two head-worn devices 20-Left and 20-Right and the personal communication device 10 are in operation. The means that the personal communication device 10 is able to act as remote control while the two head-worn devices 20-Left and 20-Right are in flight mode 62, and, very importantly be able to bring back the two head-worn devices 20-Left and 20-Right to normal radio enabled mode 60 again.

During a binaural fitting session based upon the acoustic communication link 78 and 79 (in case these are one-way), the inter-ear communication link 75 based upon an inductive link may improve robustness as the two head-worn devices 20-Left and 20-Right may detect the same acoustically transmitted data. Then the acoustically transmitted data is exchanged/negotiated by the two head-worn devices 20-Left and 20-Right via the inter-ear communication 75. This may reduce the head shadow effect, that may limit robustness when sending packets to a contra laterally positioned head-worn device 20 (hearing aid) relative to the personal communication device 10 (smartphone).

Two-Way Acoustic Communication Link

The acoustic communication link 78 and 79 may operate well as one-way communication channels, but from an error-control perspective, it is desired that either the hearing aid user receives some kind of notification about that a transferred have been successfully received as indicated earlier by playing back a pre-recorded sequence.

However, it is preferred that the personal communication device 10 and the two head-worn devices 20-Left and 20-Right are able to establish a signaling dialog. This may be beneficial in e. g. a hearing aid fitting procedure, a pairing procedure, a self-test procedure or a remote fitting procedure.

In one embodiment, the two head-worn devices 20-Left and 20-Right can only listen on one channel at a time. The personal communication device 10 may initiate a two-way acoustic communication link 78 and 79 by instructing the two head-worn devices 20-Left and 20-Right to apply a specific frequency channel which may be in the audible range and may have higher data capacity. The two head-worn devices 20-Left and 20-Right of a binaural set of hearing aids could be assigned different sync words 71 to effectively establish two two-way acoustic communication links 78 and 79.

On each acoustic communication link 78 and 79, the personal communication device 10 would send a packet 70 and listen for answer from the two head-worn devices 20-Left and 20-Right. If a response is received, the personal communication device 10 will send a new packet 70—otherwise it will resend the last packet after a certain period of time. This error control method is called Automatic Repeat reQuest (ARQ) and may be used for establishing a reliable link. The communication protocol on top of the physical layer can include: an ARQ scheme, separate control and user planes (control plane could be used to communicate about e.g. encryption or transmission speed), fragmentation of long payloads, multiplexing of logical channels.

Using the acoustic communication links 78 and 79 for two-way communication requires that there is a substantially free line of sight between the transducers (microphones and speakers) of the personal communication device 10 and the head-worn devices 20 and a short distance, preferably be less than 20 cm, and even better below 10 cm.

Fitting

The smallest hearing aids available on the market, e.g. Completely-In-Canal (CIC) hearing aids, are often offered without radios to minimize its volume. This means that the hearing aid has no Bluetooth radio or inductive radio for providing a reliable link for programming or fitting. According to the invention, the acoustic communication link 78 and 79 may be used for transferring fitting data (settings) to the hearing aids in order to alleviate the hearing loss of the user.

In this scenario the personal communication device 10 updates the fitting data of the hearing aids or the head-worn devices 20 by writing fitting data to the non-volatile memory 7 (e.g. EEPROM). The scenario also covers fine-tuning which differs from the initial hearing aid fitting in the amount of data transferred. By transferring fitting data in smaller packets, the fitter may monitor the progress of the transfer as the head-worn devices 20 reports the successful reception during the fitting process. Especially in the case of fine-tuning taking place remotely via the Internet (from the computer of the audiologist via the smart phone app 19a), the writing of EEPROM data can be accomplished directly from the personal communication device 10 (smartphone) with no intermediary fitting assistive devices. The app 19a of the personal communication device 10 may also read log data from the head-worn devices 20 and send these to the clinic (audiologist) or a central server for use in a data-driven update of the fitting. The remote fine-tuning may also be an update that the personal communication device 10 generates based on the user's input to e.g. Interactive Personalization as described in WO2016004983 A1. If the user wants to store the settings permanently (e.g. as a new program), the personal communication device 10 needs to write data to the non-volatile memory 7 (EEPROM) and require acknowledge in this process.

Acoustic Communication Pairing

In order to improve security for the acoustic communication links 78 and 79, a pairing procedure for the personal communication device 10 and the two head-worn devices 20-Left and 20-Right may be set up. During the acoustic communication pairing, the personal communication device 10 and the two head-worn devices 20-Left and 20-Right may define a communication ID for each of the two acoustic communication links 78 and 79. The communication ID is used in packets sent on the one-way link (e.g. remote control commands) in order to ensure that the users personal communication device 10 is the only device permitted to control the two head-worn devices 20-Left and 20-Right.

The communication ID can be e.g. an 8 or 10-bit sequence that must be contained or otherwise encoded into the data packet, e.g. in the sync word 71 or the payload 72. The two head-worn devices 20-Left and 20-Right will react only to packets containing the correct communication ID. Advantageously, the communication ID may be generated by the head-worn devices 20-Left and 20-Right (or programmed by the fitting software used when fitting a hearing aid or embedded into the hearing aid during the production). This enables that one or more personal communication devices 10 may be paired with the hearing aid.

As the two-way acoustic communication link 78 and 79 requires the head-worn devices 20-Left and 20-Right (e.g. hearing aids) are currently not worn, the use of acoustic communication pairing as a pre-pairing for a later Bluetooth pairing provides an improved protection against spurious Bluetooth pairings. For instance, if the hearing aids are available for one-way Bluetooth pairing for 2-3 minutes after boot, the chance of a spurious pairing is more likely than if the hearing aids must be placed next to the phone to make two-way acoustic communication pairing.

The two-way acoustic communication pairing allows the personal communication device 10 to read the program stack of the head-worn devices 20-Left and 20-Right for display on the display. This is an improved user experience.

If different hearing aid models use different acoustic communication channels (frequencies, modulation type and speed), the personal communication device 10 may try all of these and thus find the appropriate one for the specific hearing aid model. This allows that the hearing aid manufacturer may change the communication channel for one-way communication mode from series to series, and just have to update the app 19a for adding new communication channels (frequencies, modulation type and speed).

Self-Test/Performance Assessment

The two-way acoustic communication link 78 and 79 may be used to enable a self-test of the hearing aid (head-worn device 20) and report data back to the personal communication device 10 to display for the user or to send report data to an audiologist at the clinic. The self-test may ensure that different parts of the electronics function as desired or ensure the integrity of the non-volatile memory 7 (e.g. EEPROM) by checking e.g. a hash value.

The two-way acoustic communication link 78 and 79 may also be used to read out metrics related to the current hearing aid performance, e.g. battery level, active sound classes or other parameters logged by a logging function built into the hearing aid or related to the hearing aid performance/usage. The self-test is carried out by placing the personal communication device 10 adjacent to the hearing aids, e.g. on a table. By placing the personal communication device 10 and the head-worn devices 20 adjacent to each other, it is avoided that the hearing aids are not worn during the self-test, as these are resting safely in the table. Therefor the potential risk of generating loud sounds by the hearing aids in the ear of a user is eliminated.

Furthermore, hearing aids may not operate as in normal mode when performing the self-test, and therefore it is an advantage to know that the hearing aids are not being worn. Furthermore, it will be possible to read-out performance data from the HA without a radio connection, e.g. Bluetooth or magnetic induction (NFMI).

Figure 7:
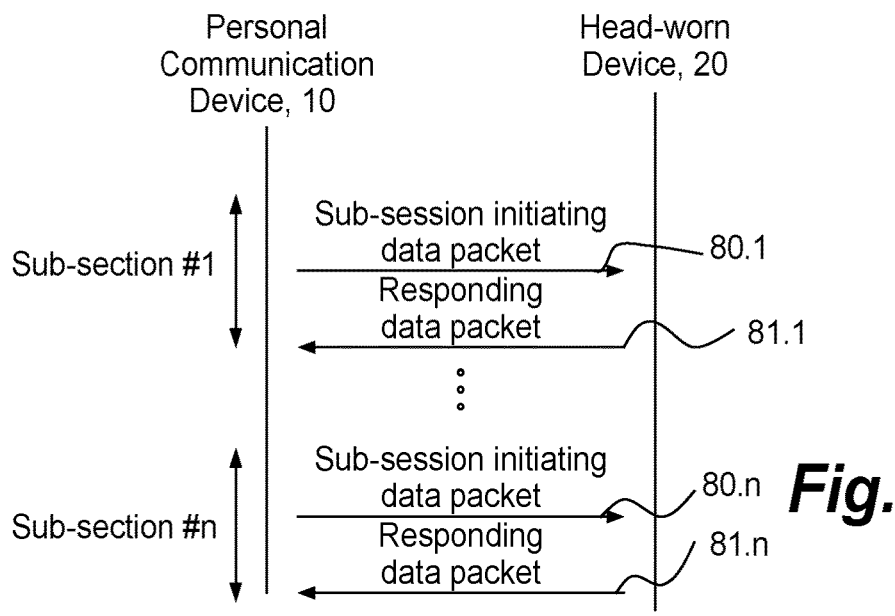
FIG. 7 illustrates a two-way communication session between a personal communication device and one head-worn device according to one embodiment of the invention.

FIG. 7 illustrates one embodiment for a two-way communication pattern between the personal communication device 10 and one of the head-worn devices 20. The data session is spilt up in smaller sub-sections, #1-#n. Each sub-session is in the illustrated embodiment initiated by the personal communication device 10 transmitting a sub-session initiating data packet 80.1. In response to the reception of the initiating data packet 80.1, the head-worn device 20 transmits a responding data packet 81.1, e.g.

confirming a successful reception of the initiating data packet 80.1;

confirming a successful execution of instructions contained the initiating data packet 80.1;

confirming a successful writing in a memory of data contained the initiating data packet 80.1; or containing data read from a memory specified by data contained the initiating data packet 80.1.

This communication pattern is controlled by the personal communication device 10, and is continued until all subsection, #1-#n, have been completed successfully.

The data session may in one embodiment consist of just one sub-session, and the data session is initiated by the personal communication device 10 transmitting at least two initiating data packets 80.1 and terminated by the head-worn device 20 transmitting at least one responding data packet 81.1.

The data session may in another embodiment consist of several sub-sessions, and at least one of these sub-sessions is initiated by the personal communication device 10 transmitting at least two initiating data packets 80.1 and terminated by the head-worn device 20 transmitting at least one responding data packet 81.1.

Figure 8:
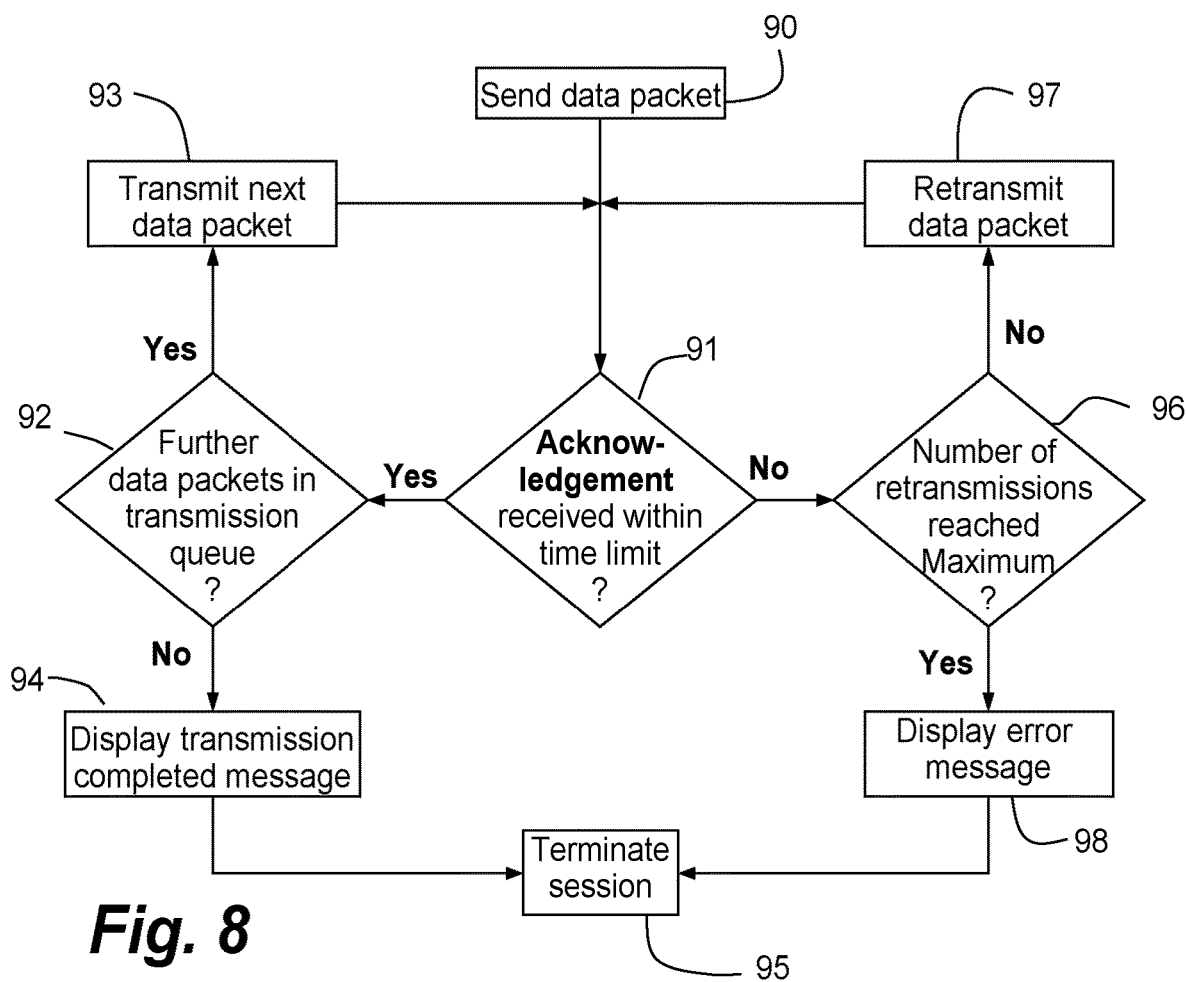
FIG. 8 illustrates as flow chart for the transmission process in the two-way communication session as illustrated in FIG. 7.

FIG. 8 illustrates as flow chart for the transmission process in the two-way communication session as illustrated in FIG. 7. In step 90, the personal communication device 10 transmits a sub-session initiating data packet 80.1 and waits in step 91 for a response from the head-worn device 20. If the personal communication device 10 receives a responding data packet 81.1 within a predefined time limit, e.g. 8 seconds, from the head-worn device 20, the personal communication device 10 deems the first sub-session of the data section to be successfully completed and progresses to step 92, in which the personal communication device 10 checks whether further data packets are present in a transmission queue. If this is the case, the personal communication device 10 transmits the next sub-session initiating data packet 80.2 and waits, in step 91, for a response. The loop is repeated until the personal communication device 10, in step 92, find the transmission queue empty. Then the personal communication device 10 deems the data session to be completed and displays, in step 94, a notification in the display 12 for the manual operator of the personal communication device 10 and terminates, in step 95, the session. The retransmission counter is reset.

In case the personal communication device 10 does not receive the responding data packet 81.1 within a predefined time limit in step 91, the personal communication device 10 checks, in step 96, whether the number of retransmissions has exceeded a predefined number. The predefined may be set to a fixed number, e.g. 8, or to a floating number depending on the number of planned sub-sessions, e.g. one per sub-session. If the predefined number of retransmission has not been reached yet, the personal communication device 10 retransmits the same sub-session initiating data packet 80.1, increments the retransmission counter by one, and waits, in step 91, for a response.

If the personal communication device 10, in step 96, detects that the number of retransmissions has exceeded a predefined number, the personal communication device 10 interrupts, in step 98, the data session and displays an error message for the manual operator of the personal communication device 10 providing hints about establishing a better connection (lees noisy environment, recommended positioning for the head-worn devices 20 relatively to the personal communication device 10 etc.). The personal communication device 10 and terminates, in step 95, the session and resets the retransmission counter.

The invention claimed is:

1. A hearing assistive system, comprising
a personal communication device having a user interface being adapted for user interaction, a processor controlling the user interface and being adapted to run an application program, an input transducer and an output transducer and
a head-worn device having an input transducer adapted for converting sound into an electric signal applied to a processor outputting a modified audio signal via an output transducer;
wherein the application program is adapted
to generate a data packet modulated on an audio carrier and output via the output transducer; and
to decode a data packet modulated on an audio carrier and received via the input transducer;
wherein the head-worn device comprises an audio signaling block having a detector block and a response block;
the detector block is adapted to detect and decode the data packet received by the input transducer; and
the response block is adapted to generate a data packet modulated on an audio carrier and output via the output transducer;
wherein the application program is configured for use in performing a self-test of the head-worn device by means of the personal communication device wherein the personal communication device requests one or more self-test results to be sent back to said personal communication device via an audio carrier from said output transducer of said head-worn device and wherein the one or more self-test results are selected from:
self-tests ensuring that a specific part of the electronics operates as desired; or
self-tests ensuring the integrity of the non-volatile memory.

2. The hearing assistive system according to claim 1, wherein the head-worn device is a hearing assistive device, and the processor is configured to compensate a hearing loss of the hearing assistive device user.

3. The hearing assistive system according to claim 1, wherein the application program of the personal communication device is adapted to transmit a plurality of data packets in a data session comprising:
an initiating transmission of at least one data packet from the personal communication device towards the head-worn device; and
a response transmission of a data packet from the head-worn device towards the personal communication device.

4. The hearing assistive system according to claim 3, wherein the application program of the personal communication device restarts the data session if the response transmission has not been received within a predefined time limit.

5. The hearing assistive system according to claim 4, wherein the application program of the personal communication device proceeds to a subsequent data session if the response transmission has been received successfully within a predefined time limit.

6. The hearing assistive system according to claim 4, wherein the application program of the personal communication device counts the number of restarts for the sub-session and discontinues the data session if the number of restarts exceeds a predefined limit.

7. The hearing assistive system according to claim 1, wherein the application program is adapted use when updating fitting data by writing fitting data to a non-volatile memory of the head-worn device by means of the personal communication device.

8. The hearing assistive system according to claim 1, wherein said application program is configured to cause said personal communication device to request said one or more self-test results while said head-worn device is not being worn.

9. The hearing assistive system according to claim 1, wherein said self test result is from a self-test ensuring the integrity of the non-volatile memory by checking a hash value.

10. A method of providing two-way communication between a head-worn device and a personal communication device wherein the personal communication device has a user interface being adapted for user interaction, a processor controlling the user interface and being adapted to run an application program, an input transducer and an output transducer, and wherein the head-worn device comprises an input transducer adapted for converting sound into an electric signal applied to a processor outputting a modified audio signal via an output transducer wherein the method comprises:
in the personal communication device, generating a data packet by means of the application program running on the processor and outputting the data packet on an audio carrier via the output transducer;
in the head-worn device, receiving the data packet via the input transducer and decoding the data packet in an audio signaling block;
in the head-worn device, providing a responding data packet in the audio signaling block and outputting the data packet on an audio carrier via the output transducer; and
in the personal communication device, receiving the data packet via the input transducer and decoding the data packet data packet in the application program running on the processor;
wherein the method further comprises performing a self-test of the head-worn device by means of the personal communication device wherein the personal communication device requests one or more self-test results to be sent back to said personal communication device via an audio carrier from said output transducer of said head-worn device and wherein the one or more self-test results are selected from:
- self-tests ensuring that a specific part of the electronics operates as desired; or
- self-tests ensuring the integrity of the non-volatile memory.

11. The method according to claim 10, wherein a data session comprising:
- an initiating transmission of at least one data packet from the personal communication device towards the head-worn device; and
- a response transmission of a data packet from the head-worn device towards the personal communication device.

12. The method according to claim 11, and further comprising retransmitting of the initiating transmission if the response transmission has not been received within a predefined time limit.

13. The method according to claim 11, and further comprising proceeding to a subsequent data session if the response transmission has been received successfully within a predefined time limit.

14. The method according to claim 11, and further comprising counting the number of restarts for the sub-session and discontinuing the data session if the number of restarts exceeds a predefined limit.

15. The method according to claim 10, and further comprising updating fitting data by writing fitting data to a non-volatile memory of the head-worn device.

16. The method according to claim 10, and further comprising pairing of the personal communication device and the head-worn device by exchanging ID data during the data session, and initiating a new data session for the personal communication device and the head-worn device, in which the personal communication device sends radio pair command inviting the head-worn device to enter pairing mode for the short-range radio based upon the ID data exchanged.

17. The method according to claim 10, wherein said personal communication device requests said one or more self-test results while said head-worn device is not being worn.

18. The method according to claim 10, wherein said self test result is from a self-test ensuring the integrity of the non-volatile memory by checking a hash value.

* * * * *